United States Patent [19]
Steiner et al.

[11] Patent Number: 5,949,933
[45] Date of Patent: Sep. 7, 1999

[54] LENTICULAR ILLUMINATION SYSTEM

[75] Inventors: Ivan B. Steiner, Ridgewood; Karl W. Beeson, Princeton, both of N.J.

[73] Assignee: AlliedSignal Inc., Morris Township, N.J.

[21] Appl. No.: 09/033,772

[22] Filed: Mar. 3, 1998

[51] Int. Cl.$^6$ ................................................. G02B 6/34
[52] U.S. Cl. ............................................ 385/36; 362/551
[58] Field of Search .............................. 385/31, 36, 39; 362/559–560, 561, 551; 359/15, 1, 487, 494, 385, 709; 349/65, 64, 70

[56] References Cited

U.S. PATENT DOCUMENTS

| | | | |
|---|---|---|---|
| 4,367,463 | 1/1983 | Suzuki et al. | 345/9 |
| 4,498,742 | 2/1985 | Uehara | 359/385 |
| 5,587,816 | 12/1996 | Gunjima | 349/62 |
| 5,828,471 | 10/1998 | Davis et al. | 359/15 |
| 5,838,403 | 11/1998 | Jannson et al. | 362/26 |

*Primary Examiner*—Akm E. Ullah
*Attorney, Agent, or Firm*—John A. Squires

[57] ABSTRACT

An optical illumination system comprising a waveguide that accepts light and transmits the light via total internal reflection. Attached on one face of the waveguide is an array of lenticular microprisms, with each microprism having an light input surface optically coupled to the waveguide and a light output surface. The light input surface is defined by a number of tapered grooves which prevent light from escaping from the waveguide and further redirect light within the microprism. Light that escapes from the waveguide, reflects off the tilted sidewalls of the tapered grooves and emerges from the microprism as a spatially directed light source. An array of lenticular microlenses may be positioned to accept the output of the microprisms so that the light exiting from the microlenses is a substantially collimated light source.

10 Claims, 8 Drawing Sheets

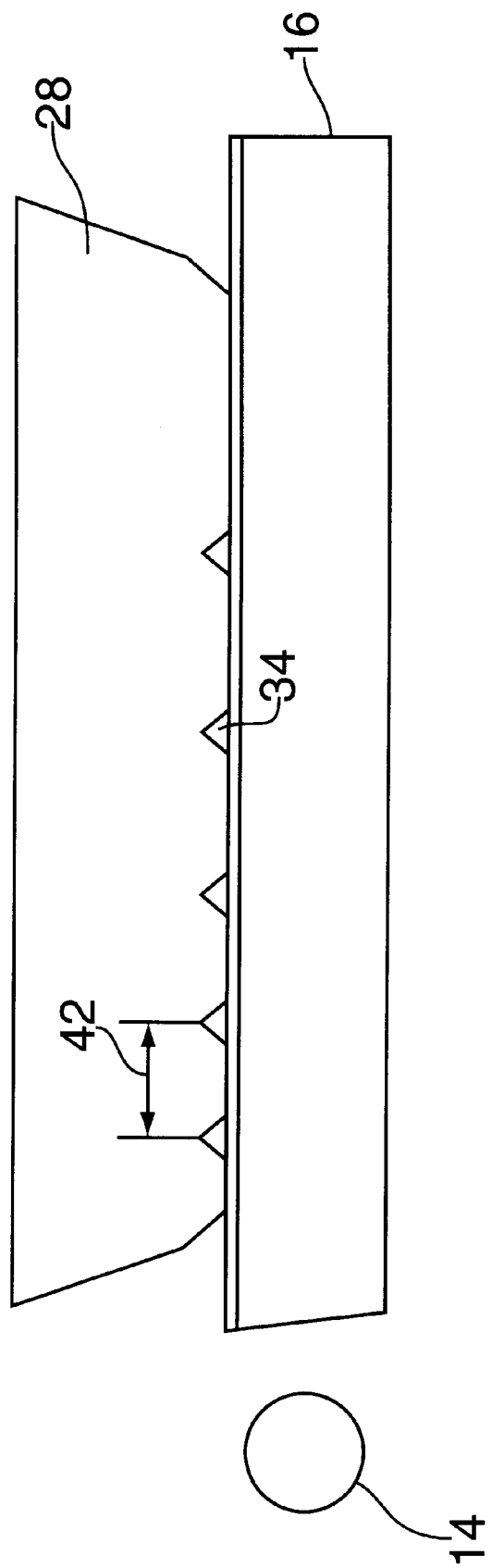

LENTICULAR ILLUMINATION SYSTEM

BACKGROUND OF THE INVENTION

This invention relates generally to an optical illumination system for collimating light. More particularly, the invention is directed to an illumination system having a plurality of lenticular optical microprisms and microlenses for redirecting light removed from a non-collimated light source and providing either separately or in combination a non diffuse or a substantially collimated light source output.

A number of optical and illumination applications require the production of either a non diffuse or a collimated light source which provides an efficient output of light. Typical problems encountered with providing a collimated light source within a compact design or narrow profile include: 1) a non-uniform light distribution; 2) a lack of a controlled directional output of light; 3) inefficiencies with regard to the amount of the collimated light output versus the amount of the non-collimated light input; and 4) manufacturing the apparatus for providing a collimated light source.

Accordingly, there exists a need in the optical and illumination arts to provide an illumination assembly that provides an energy efficient light source having a uniform light distribution while maintaining a narrow profile.

Representative illumination systems that address the deficiencies of the prior art are disclosed in U.S. Pat. Nos. 5,555,329; 5,521,725; 5,428,468; and 5,396,350 all which are assigned to the assignee of the present invention and which are all incorporated herein by reference.

SUMMARY OF THE INVENTION

The present invention is directed to an illumination system which provides either separately or in combination a non diffuse or a substantially collimated light source that is energy efficient (hereinafter referred to as a spatially directed light source). Additionally, this invention is directed to any lighting application that requires a low profile spatially directed light source.

The invention comprises a means for transmitting light, having a refractive index $n_1$, in optical cooperation with a light input surface of a means for removing light from the light transmitting means and reflecting the light to an output surface and having a refractive index $n_2$, wherein the continuity of the light input surface is interrupted by regions having a refractive index $n_3$, where $n_3 < n_1$ and $n_2$.

Specifically, the invention is an illumination system that is designed to accept a diffuse input light source for transmission within a waveguide or other light transmitting means. A reflecting means is optically coupled to the light transmitting means and removes light from the light transmitting means and redirects the light to an output surface. Optionally, a low index of refraction layer is disposed between the light transmitting means and the light reflecting means. The reflecting means comprises an array of lenticular microprisms having a light input surface in optical cooperation with the waveguide or alternatively, the array of lenticular microprisms is in further optical cooperation with an array of lenticular microlenses whereby the microprisms are operatively disposed between the light transmitting means and the microlenses. The light input surface is defined by a number breaks which, where present, inhibit light from escaping from the waveguide to the microprism. The reflecting means of the present invention provides an energy efficient distribution of spatially directed light that is provided in a low profile assembly.

Objects, advantages and novel features of the invention will be set forth the description which follows, and in part will become apparent to those skilled in the art upon examination of the following or may be learned by practice of the invention. The objects and advantages of the invention may be realized and attained by means of the elements and combinations particularly pointed out in the appended claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIGS. 3a–b are elevation views of alternate embodiments of the invention;

DETAILED DESCRIPTION OF THE PREFERRED EMBODIMENTS

The preferred embodiments of the present invention will be better understood by those skilled in the art by reference to the above figures. The preferred embodiments of this invention illustrated in the figures are not intended to be exhaustive or to limit the invention to the precise form disclosed. They are chosen to describe or to best explain the principles of the invention and its applicable and practical use to thereby enable others skilled in the art to best utilize the invention.

Figure 1:
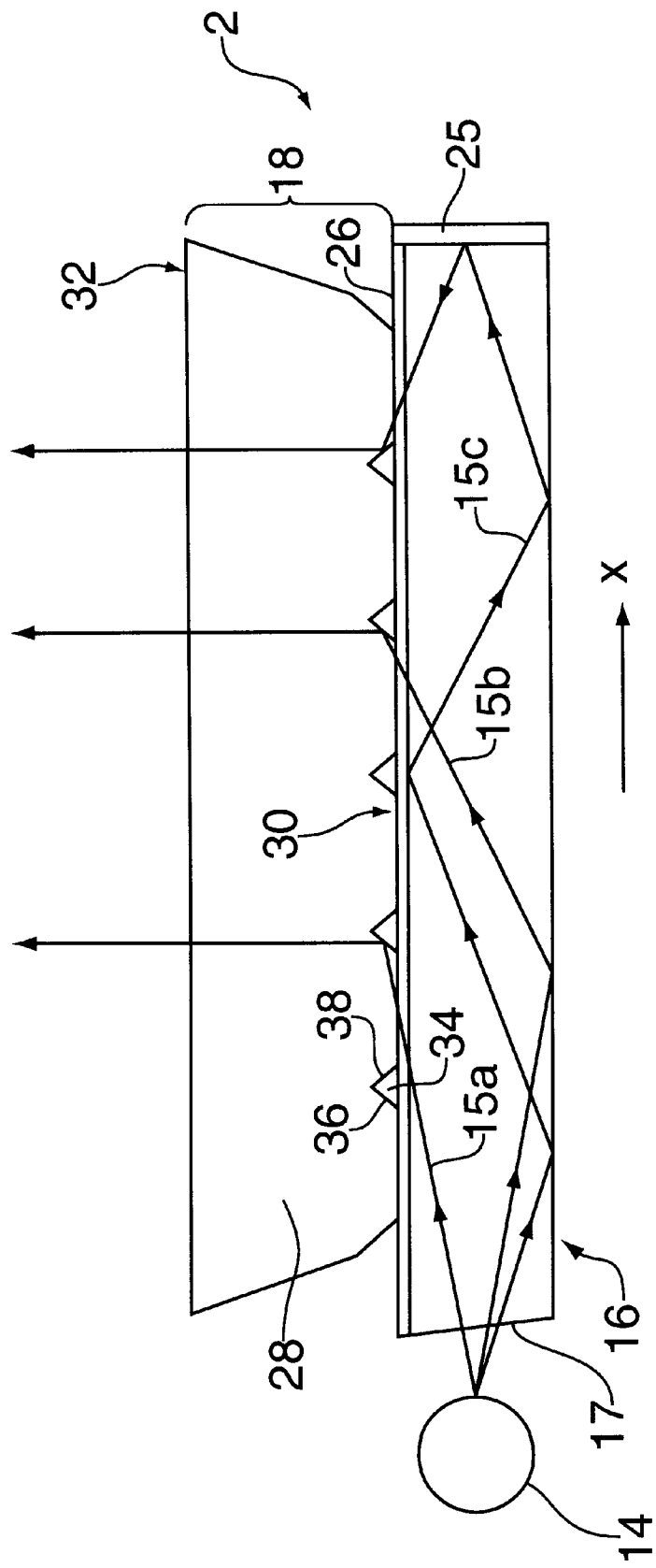
FIG. 1 is an elevation view of one embodiment of the present invention in conjunction with a single input light source.

One preferred embodiment of the present invention is shown in FIG. 1. An illumination system 2 comprises a light generating means 14, a waveguide 16 having a light accepting surface 17 and a transparent reflecting means 18 in optical cooperation with waveguide 16. Optical cooperation is meant to mean any relationship between waveguide 16 and reflecting means 18 which enables light to pass from waveguide 16 to reflecting means 18. Illustrative of useful light generating means 14 are lasers, fluorescent tubes, light emitting diodes, incandescent lights, sunlight and the like.

The reflecting means 18 comprises an optional low index of refraction layer 26, which could also function as an adhesion promoting layer, and an array of lenticular microprisms 28. The length of microprisms 28 is aligned in the general direction of the travel of the light through waveguide 16. Light reflects through waveguide 16 via total internal reflection (TIR) in the general direction of the X axis and enters a microprism 28 by way of light input surface 30 and exits the microprism 28 through the light output surface 32 as a spatially directed light source as illustrated by exemplary light rays 15a–15c. Light input surface 30 is further defined by selected surface voids 34 that, where present along the light input surface, inhibit the transmission of light from the waveguide to the reflecting means as illustrated by light ray 15c. Voids 34 can be characterized as channels or grooves, defined by a material having a refractive index less than the refractive index of waveguide 16 or refraction layer 26, that interrupt the continuity of light input surface 30.

Figure 2:
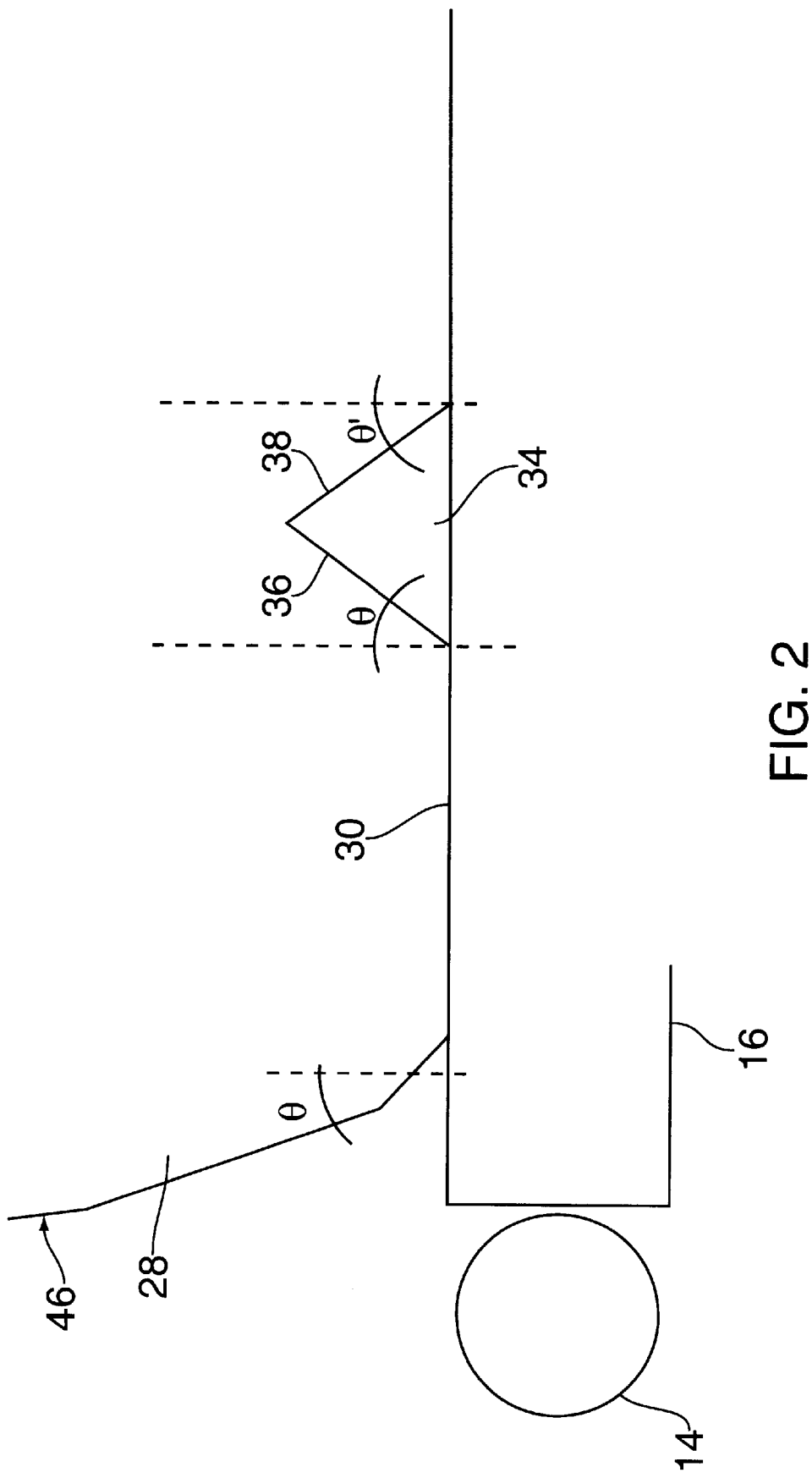
FIG. 2 is an exploded view of the embodiment of FIG. 1.

Referring also to FIG. 2, voids 34 are interstitial regions defined by sidewalls 36 and 38 which further define the interface between the refractive indices of microprism 28 and voids 34. Voids 34 may be of any shape as long as the shape is tapered and the width of the "bottom" of the void near the waveguide is wider than the width of the "top" of the void. Surfaces 36 and 38 may be flat, curved, or faceted. For illustrative purposes only, FIG. 2 defines voids 34 as "V"-shaped grooves with flat sidewalls 36 and 38. Voids 34 comprising sidewalls 36 and 38 extend through microprism 28 in a direction generally perpendicular to the direction of travel of light rays in the x axis. Preferably, voids 34 extend the entire width of the microprism 28, but it is not necessary. In the case where sidewalls 36 and 38 are flat, they form angles θ and θ', respectively, relative to the normal of input surface 30. Voids 34 prevent light from entering microprism 28 as shown in FIG. 1 due to the differences in refractive indices between waveguide 16 or the low index layer 26 and void 34. The interstitial regions of void 34 must have an index of refraction less than the index of refraction of the waveguide 16 or low index layer 26. Preferred materials for void 34 include air, with an index of refraction of 1.00 and fluoropolymer materials with an index of refraction ranging from about 1.16 to about 1.40. The most preferred material is air. In addition, sidewalls 36 and 38 redirect a portion of light rays that enter microprism 28 through input surface 30.

Figure 4:
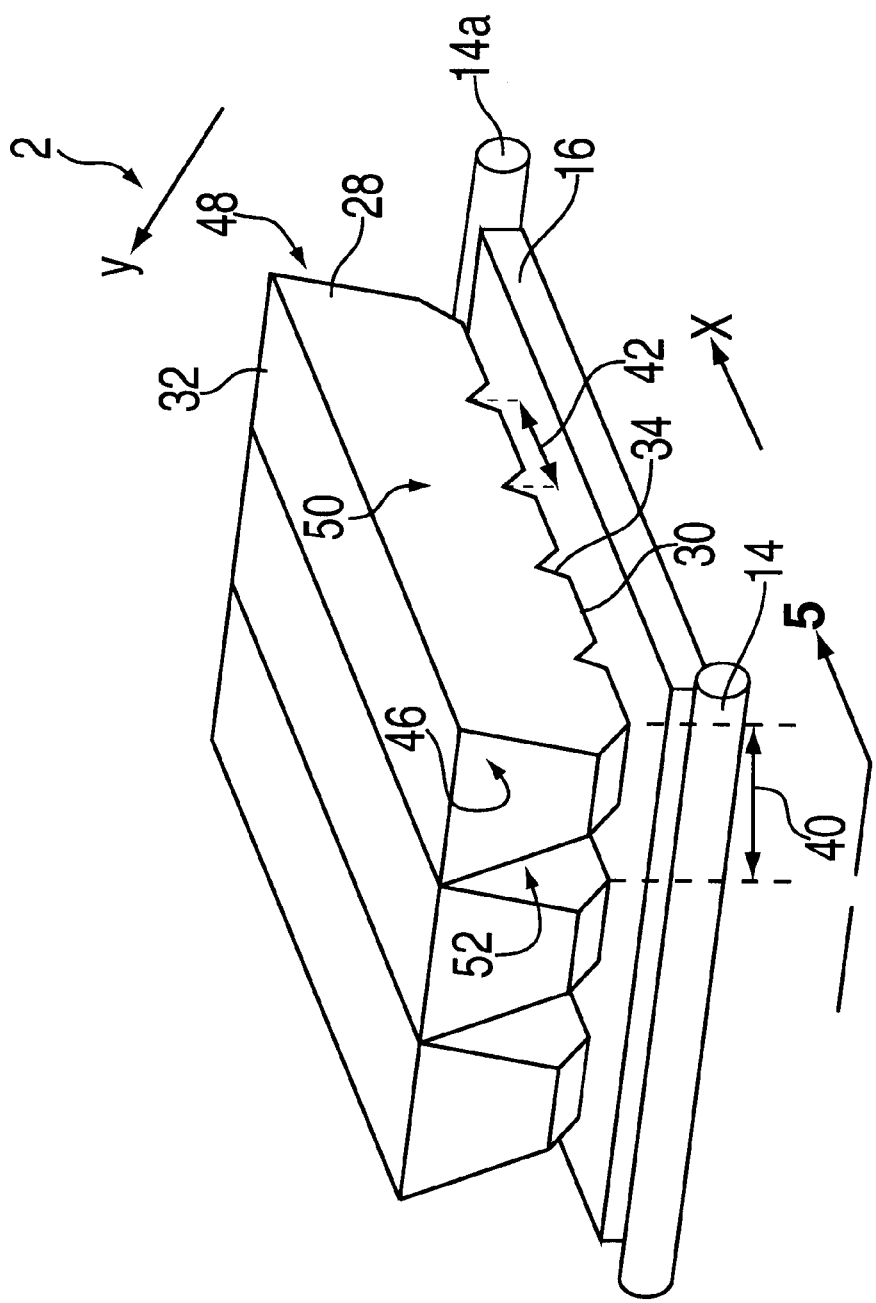
FIG. 4 is a perspective view of the embodiment of FIG. 1.

Referring to FIG. 2, angles θ and θ' do not have to be equal. Angles θ and θ 'control the direction of the light escaping from the microprisms and are important for determining the degree of collimation of the output light. These angles can vary over a wide range depending on the desired output angle of the light and the desired degree of collimation. If a single light source is used in an application as shown in FIG. 1, only the value of angle θ is important to redirect light. For the special case where sidewalls 36 and 38 are flat and where the desired output angle is perpendicular to the plane of the waveguide the desired values of angle θ range from about 15 degrees to about 50 degrees. More preferred values range from about 20 degrees to about 40 degrees. The value of angle θ' is important if light rays travel in both directions along the x axis. This is possible, if for example, reflective means 25 is applied to a surface of waveguide 16 (FIG. 1), opposite light accepting surface 17 or a second light source 14a is utilized as shown in FIG. 4. Reflective means 25 may be a mirror, reflective tape or any other highly reflective material.

Waveguide 16 may be any material that is transparent to light. Preferably waveguide 16 is transparent to light within the wavelength range from about 400 to about 700 nm. The preferred index of refraction of the waveguide 16 is greater than about 1.30. More preferred indexes of refraction may range from about 1.40 to about 1.65. Preferred materials include transparent polymers, glass and fused silica. Desired characteristics of these materials include mechanical and optical stability at typical operation temperatures of the device. Most preferred materials are glass, acrylic, polycarbonate and polyester. Alternatively, the waveguide may be a cavity having a reflective surface with the exception of the area that defines the light input surface. Cavity reflectance can be achieved using aluminum coated smooth surfaces.

Microprisms 28 can be constructed from any transparent solid material. Preferred materials have a refractive index between about 1.40 and about 1.65 and include polymethylmethacrylate, polycarbonate, polyester, poly(4-methyl pentene), polystryrene, allyl diglycol carbonate, poly (styrene-co-acrylonitrile) poly(styrene-co-methyl methacrylate), silicone, polyurethanes and polymers formed by photopolymerization of acrylate monomers.

Referring to FIG. 4, microprisms 28 are constructed to form a six-sided geometrical shape having a light input surface 30, a light output surface 32, wherein the light output surface 32 is larger in surface area than the light input surface 30. Microprism 28 further comprises two pairs of oppositely disposed sidewalls 46, 48 and 50, 52. Sidewalls 50 and 52 are effective in reflecting and redirecting the light which is propagating through microprism 28. In most cases, sidewalls 46 and 48 have no optical function. However, it may be necessary to tilt sidewalls 46 and 48 so that light reflecting from voids 34 will not strike sidewalls 46 and 48.

Figure 5:
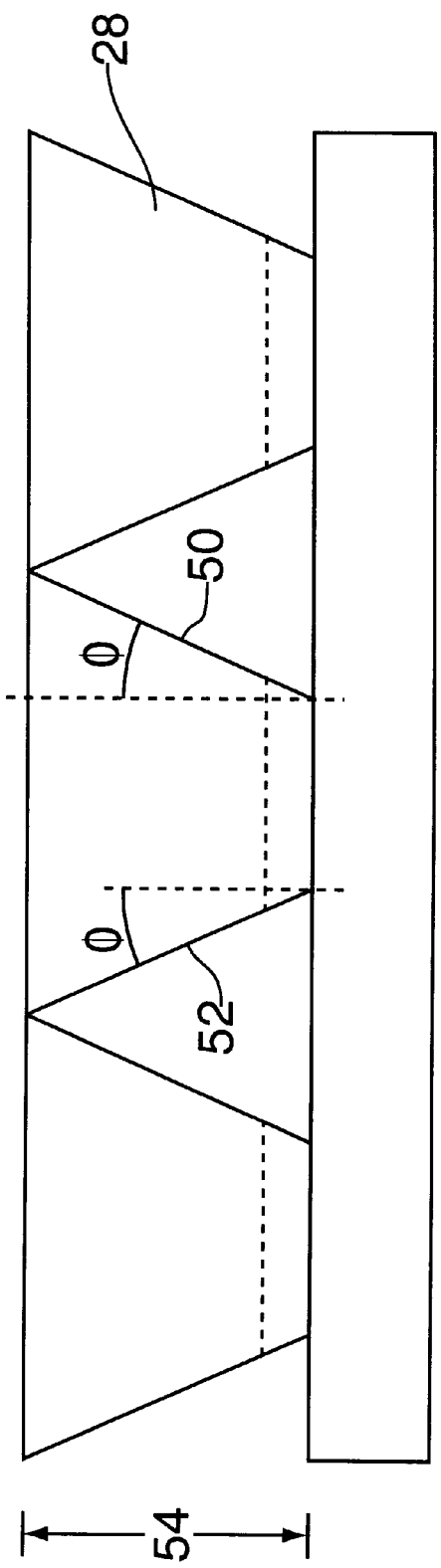
FIG. 5 is a different elevation view of the embodiment of FIG. 1.

Referring to FIG. 5, sidewalls 52 and 50 form a tilt angle φ to the normal of the surface of waveguide 16. Sidewalls 52 and 50 help control the output collimation in the direction parallel to input 17 of the light transmitting means. The desired values of tilt angle φ range from about 0 degrees to about 30 degrees. More preferred values for tilt angle φ range from about 5 degrees to about 20 degrees. Preferably, the tilt angles φ associated with sidewalls 52 and 50 are equal, but equal angles are not necessary.

The height 54 may vary widely depending on the dimensions and resolution of the display or lighting application. That is, smaller displays, such as laptop computer displays and avionics displays would have greatly reduced dimensions versus larger displays such as large screen, flat-panel televisions.

Referring again to FIG. 1, the optional low index of refraction layer 26 is any material that is light transmissive and has an index of refraction that is lower than the index of refraction of waveguide 16. The low index of refraction layer may be either an inorganic material such as magnesium fluoride or an organic material such as silicone. If layer 26 is also an adhesion promoting layer, it will cause the microprisms 28, especially microprisms formed from polymers, to adhere strongly to the waveguide 16. The thickness of the low index of refraction layer 26 is not critical and can vary widely. In the preferred embodiment of the invention, low index of refraction layer 26 is less than about 75 micrometers thick.

Figure 3B:
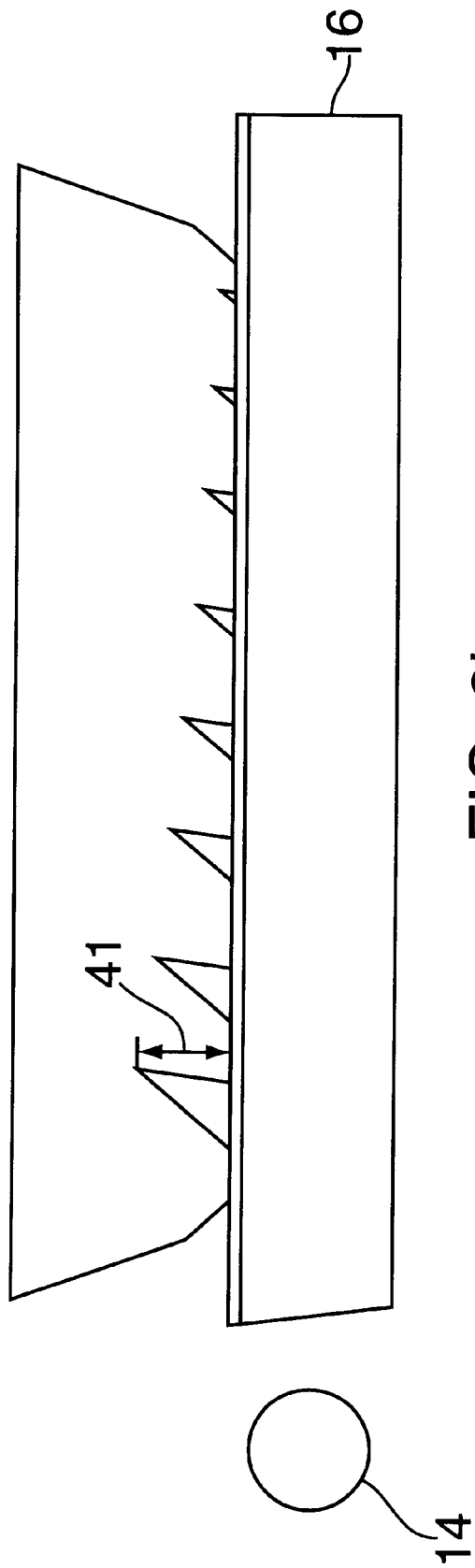

Referring again to FIG. 4 and as would be obvious to those skilled in the art, microprisms 28 may have any repeat distance 40 in the y direction. Further, the repeat distance 42 of voids 34 may vary in the x direction. Distances 40 and 42 may vary depending on the resolution and dimensions of an electronic display or the lumens output requirement of a lighting application. Further, in the single light source application shown in FIG. 3a, distance 42 may vary widely across the surface of waveguide 16 in order to compensate for a lowering of the light intensity inside waveguide 16 as the distance from light generating means 14 increases. In this application, the repeat distance 42 would be smaller closer to the light accepting surface 17 and gradually increase moving away from light source 14. In essence, closely-spaced voids 34 decrease the amount of light input surface area adjacent to light accepting surface 17 and widely-spaced voids 34 increase the available light input surface area remote from light accepting surface 17. Alternatively, light input surface may be varied across the microprism 28 by varying the depth 41 of interruption 34 as shown in FIG. 3b.

Figure 6:
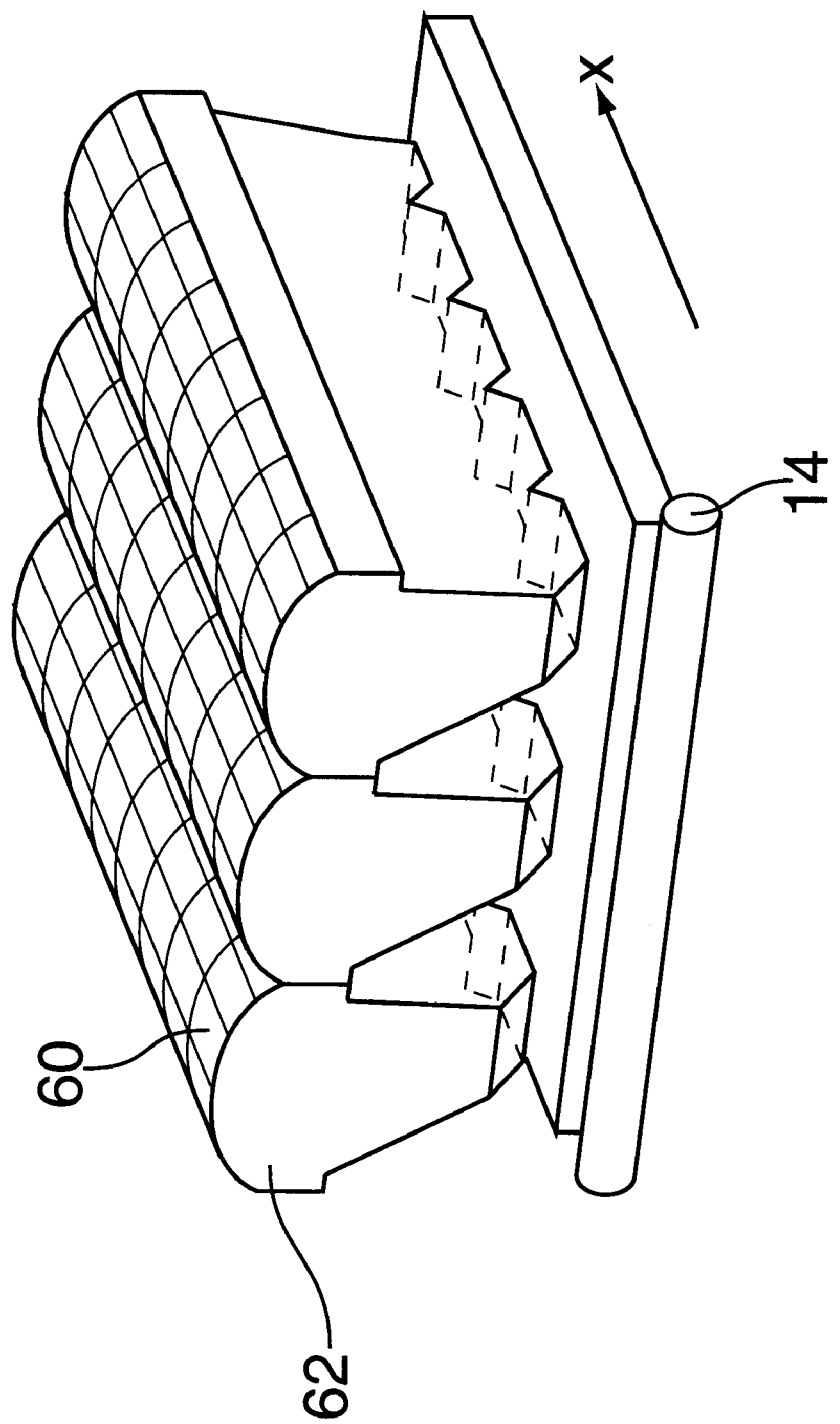
FIG. 6 is a perspective view of a further embodiment of the present invention.

In an alternate embodiment, reflecting means 18 further comprises a lenticular array of cylindrical microlenses 60 as shown in FIG. 6. Alternatively, the lenticular microlens curvature may have a shape other than cylindrical, such as, and for example only, an elliptical or a parabolic cross section. The microlenses 60 are disposed in close proximity to the microprisms 28. The microlenses 60 preferably have a index of refraction equal to the index of refraction of the microprisms 28. However, microlenses 60 could be fabricated in a separate process from the microprisms 28 and any transparent material may be used, as for example, those materials previously discussed. If a separate process is used to fabricate the microlenses 60, it is preferred that the index of refraction of the microlenses 60 be equal or substantially equal to the index of refraction of the microprisms 28. The center-to-center distance between microlenses directly correlates to the repeat distances 40 of the microprisms 28. That is, for every microprism 28 there exists a corresponding microlens 60 that aligns with the output surface 32 of each microprism 28.

A spacer 62 separates the microlenses 60 and the microprisms 28. The thickness of spacer 62 is optimized to cause light from microprisms 28 to be collimated by microlenses 60. Preferably spacer 62 is molded in the same process that was used to mold microprisms 28 and microlenses 60 and therefore is the same material as the microprisms 28 and microlenses 60. However, in general, spacer 62 may be fabricated separately from any transparent material. Preferred materials include transparent polymers, glass and fused silica. Preferably spacer 62 has an index of refraction equal to or substantially equal to the index of refraction of the microprisms 28 and the microlenses 60. Desired characteristics of these materials include mechanical and optical stability at typical operation temperatures of the device. Most preferred materials are glass, acrylic, polycarbonate and polyester.

Arrays of microprisms 28 separately or in combination with microlenses 60 can be manufactured by any number of well known techniques such as molding, including injection and compression molding, casting, including hot roller pressing casting, photopolymerization within a mold and photopolymerization processes which do not employ a mold. One advantage of the invention over the prior art is the lenticular arrangement which facilitates the fabrication process by facilitating the free flow of resin within a mold. A preferred manufacturing technique would be one that allows the reflecting means 18 which comprises an array of microprisms 28, an array of microlenses 60 and a spacer 62 to be manufactured as a single integrated unit. An advantage of this technique would be the elimination of alignment errors between the array of microprisms and microlenses if the arrays were manufactured separately and then attached in the relationship described above. Preferably reflecting means 18 is manufactured by injection or compression molding.

EXAMPLE

A polystyrene part was injection molded having lenticular prisms in combination with cylindrical lenses as shown in FIG. 6. The lenticular prisms were 0.0125 inches wide at the base of the prism and 0.020 inches wide at the top of the prism. The prisms had a height of 0.019 inches. The cylindrical lenses were separated from the tops of the prisms by a polystyrene spacer layer 0.025 inches thick. There was one cylindrical lens for each lenticular prism. The cylindrical lenses had a radius of curvature of 0.024 inches and were aligned with the tops of the prisms. The lenticular prisms had "V-shaped" grooves or voids positioned every 0.016 inches along the long direction of the prisms. The depth of the grooves was 0.0097 inches.

Figure 7:
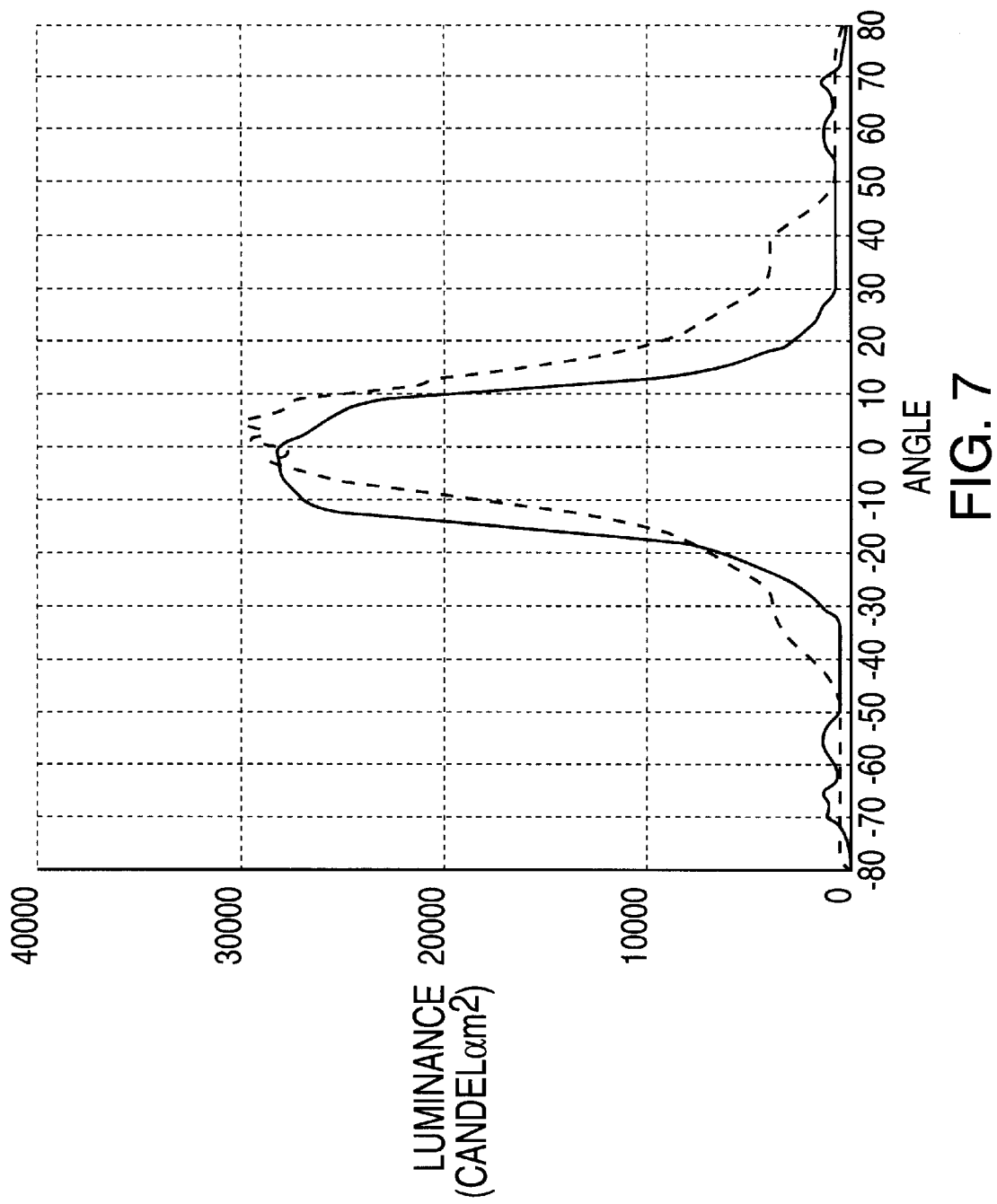
FIG. 7 is a graphical view of the light output distribution in two perpendicular directions when light is collimated by the embodiment of FIG. 6.

The polystyrene part was attached to a clear acrylic waveguide using a silicone pressure-sensitive adhesive layer 0.001 inches thick. The silicone pressure-sensitive adhesive had a refractive index of 1.41, which was lower than the refractive index of both the acrylic waveguide (refractive index=1.49) and the polystyrene molded part (refractive index=1.59). Light from two fluorescent lamps was coupled into two opposing ends of the acrylic waveguide. The general direction of the light was parallel to the direction of the lenticular prisms and lenses of the attached molded part. Light in the waveguide was able to pass through the silicone layer and enter the molded part in the regions where the molded part touched the pressure-sensitive adhesive. The surface area on the waveguide occupied by the voids (refractive index=1.00) did not allow light to pass from the waveguide. The walls of the void redirected light within the lenticular prisms. The light emerged from the molded part highly collimated and in a direction approximately perpendicular to the plane of the waveguide. The light had collimation angles (the full width of the peak at the half maximum points) of ±14° in one direction and ±13.7° in the perpendicular direction. Cross-sectional views of the light distribution in two perpendicular directions are shown in FIG. 7.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An illumination assembly comprising a means for transmitting light, having a refractive index $n_1$, in optical cooperation with a light input surface of a means for removing light from the light transmitting means and reflecting the light to an output surface and having a refractive index equal to $n_2$, wherein the continuity of the light input surface is interrupted by regions having a refractive index $n_3$, where $n_3 < n_1$ and $n_2$.

2. The illumination assembly of claim 1 wherein said means for removing light is lenticular.

3. The illumination assembly of claim 1 wherein the regions having a refractive index $n_3$ define a tapered volume.

4. The illumination assembly of claim 3 wherein the interface between indices $n_2$ and $n_3$ reflect light within the light removing means.

5. The illumination assembly of claim 3 wherein the tapered volume is V-shaped.

6. An illumination assembly for providing a spatially directed light source comprising:
   a means for transmitting light having a refractive index $n_1$ and a first light accepting surface for accepting a light input; and
   an array of lenticular microprisms comprising
   i) a light input surface for receiving light from said means for transmitting light, said light input surface having selected interstitial regions of a refractive index $n_2$ where $n_2 < n_1$; and
   ii) a light output surface having a surface area greater than the surface area of said light input surface.

7. The illumination assembly of claim 5 wherein said output surface is parallel to said light input surface.

8. The illumination assembly of claim 5 wherein said output surface is a curved.

9. An illumination assembly for providing a spatially directed light source comprising:

a) a means for transmitting light having a refractive index $n_1$ and a first light accepting surface for accepting a light input; and b) an array of lenticular microprisms comprising a length and a width, a light input surface for receiving light from said light transmitting means, said light input surface having selected interstitial regions of a refractive index $n_2$ where $n_2<n_1$ and a light output surface having a surface area greater than the surface area of said light input surface; and the length of each microprism is aligned in the general direction of the travel of the light through the means for transmitting light, and the interstitial regions are aligned in the general direction perpendicular to the direction of the travel of light.

10. The illumination assembly of claim 9 wherein said output surface is a curved.

* * * * *